United States Patent
Tsai et al.

(10) Patent No.: US 8,090,021 B2
(45) Date of Patent: Jan. 3, 2012

(54) METHOD FOR MOTION SEARCH BETWEEN VIDEO FRAMES WITH MULTIPLE BLOCKS

(75) Inventors: Tsung-Han Tsai, Taoyuan (TW); Yu-Nan Pan, Taoyuan (TW)

(73) Assignee: National Central University, Taoyuan (TW)

( * ) Notice: Subject to any disclaimer, the term of this patent is extended or adjusted under 35 U.S.C. 154(b) by 1429 days.

(21) Appl. No.: 11/566,241

(22) Filed: Dec. 4, 2006

(65) Prior Publication Data

US 2007/0258521 A1 Nov. 8, 2007

(30) Foreign Application Priority Data

May 2, 2006 (TW) ................ 95115548 A (51) Int. Cl.
*H04N 7/36* (2006.01)

(52) U.S. Cl. .......... 375/240.16; 375/240.08; 375/240.24

(58) Field of Classification Search ............. 375/240.16, 375/240.08, 240.24
See application file for complete search history.

(56) References Cited

U.S. PATENT DOCUMENTS 7,471,725 B2 * 12/2008 Linzer et al. ............. 375/240.16

FOREIGN PATENT DOCUMENTS

JP 01069181 A * 3/1989

* cited by examiner

*Primary Examiner* — Christopher S Kelley
*Assistant Examiner* — Jeffery Williams
(74) *Attorney, Agent, or Firm* — Jianq Chyun IP Office (57) ABSTRACT

A method for motion search between video frames with multiple blocks is disclosed. The present invention provides an effective edge detection-prediction hexagon search algorithm (EDPHS algorithm). The method uses edge values and the distribution characteristics of motion vector and further overcomes the drawback of the conventional hexagon-based search algorithm (HEXBS algorithm). In this way, the present invention has less search points during searching. Through experiments, the present invention, without affecting the compressed video quality, reduces the number of search points by about 80%~98% in comparison with the diamond search algorithm (DS algorithm) and reduces the number of search points by about 75%~97% in comparison with the HEXBS algorithm. The advantages make the present invention suitable for the realizing real-time image compression.

14 Claims, 6 Drawing Sheets

METHOD FOR MOTION SEARCH BETWEEN VIDEO FRAMES WITH MULTIPLE BLOCKS

CROSS-REFERENCE TO RELATED APPLICATION

This application claims the priority benefit of Taiwan application serial no. 95115548, filed May 2, 2006. All disclosure of the Taiwan application is incorporated herein by reference.

BACKGROUND OF THE INVENTION

1. Field of Invention

The present invention relates to a method for video compression, and more particularly, to a method for motion search between video frames with multiple blocks.

2. Description of the Related Art

In recent years, the popularity in network and the progress in the multimedia transmission technique make the exchange of video data indispensable in our daily life. To use the limited transmission bandwidth effectively for transmitting video data with the most contents and the best quality, it is necessary to adopt the most advanced method for compressing video and data. Among the currently available image compression technologies, the standard H.264 is the most advanced one, which was established by the incorporation of the Video Coding Experts Group Alliance (VCEG-Alliance) of International Telecommunication Union (ITU) and the Moving Picture Experts Group Alliance (MPEG-Alliance) of International Electrotechnical Commission (IEC) affiliated by International Organization for Standardization (ISO).

The major objective of H.264 is to effectively advance the compression rate of video data for a better effect of video data transmission on a network. In comparison with the previous standard H.263 plus or the MPEG-4, H.264 saves a compression rate with approximate 50%, and has a higher quality. Although H.264 has a higher compression rate and better compression quality, it still requires a huge computation due to multiple configurations of blocks and multiple referencing the standard supports. Wherein, the computation of motion estimation takes over 80% of the entire computation, therefore, a good motion estimation algorithm is essential to decrease the computation thereof.

Among the methods for searching the best motion vector, full search (FS) is one of them that searches all the points within a search range. Through the FS, a block with the least error is obtained, but the complexity of the FS is also rised correspondingly. To overcome the disadvantage, a lot of algorithms were provided, for example, diamond search (DS), diamond search (DS), and so on.

Figure 1:
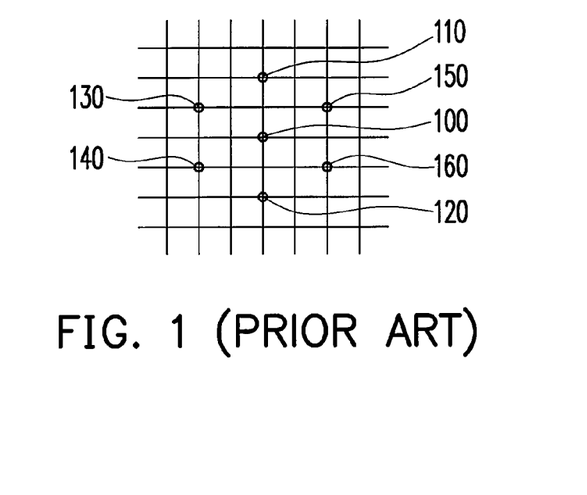
FIG. 1 is a diagram showing a search pattern with hexagon-based search (HEXBS) algorithm.

FIG. 1 is a diagram showing a search pattern with hexagon-based search (HEXBS) algorithm, wherein a center point 100, two search points 110 and 120 having a distance of 2 from the center point 100 and located at the upper side and the lower side of the center point 100, respectively, and four search points 130, 140, 150 and 160 having a distance of $\sqrt{5}$ from the center point 100 and located at the upper-left side, the lower-left side, the upper-right side and the lower-right side of the center point 100, respectively, are included. The algorithm computes the image error values of the blocks belong to the seven search points respectively, so as to find out the least-error block with the least error value. Then, the search point corresponding to the least-error block is taken as a new center point for restarting a new search until the center-point block becomes the least-error block. Although the above-described HEXBS algorithm has search points less than the FS, it is still not sufficient to catch the increasing speed of the resolution and the capacity of current video files. Therefore, how to effectively advance the speed of motion estimation searching between video frames has become one of the significant projects desired to be solved in video compression technique today.

SUMMARY OF THE INVENTION

The objective of the present invention is to provide a method for motion search between video frames with multiple blocks, which uses a small range searching pattern (SR pattern) to identify the distribution direction of a motion vector and further selects and uses a large range pattern (LR pattern), so as to reduce the number of the search points required by searching the least-error block and increase the search speed.

The present invention provides a method for motion search between video frames with multiple blocks, which includes the following steps. First, the edge values (EVs) of the multiple blocks within a video frame are computed. Next, whether the EVs of the blocks are smaller than a threshold value (TV) is judged. If there is a block having the EV smaller than the TV, the block is taken as a search block; otherwise, an edge value difference (EVD) between the EV and the TV of every the block is respectively computed. Furthermore, a block having the least EVD among the blocks is selected as a search block. In the end, a set of steps for motion estimation searching on the basis of the search block is performed.

According to the method for motion search between video frames with multiple blocks described in an embodiment of the present invention, the step for computing the EVs of all the blocks within a video frame includes computing the EVs of all the 4×4 blocks within the video frame, followed by using the EVs of the 4×4 blocks to compute the EVs of all the 8×8 blocks and the 16×16 blocks.

According to the method for motion search between video frames with multiple blocks described in an embodiment of the present invention, the step for judging whether the EV of a block is smaller than the TV includes the following sub-steps. First, whether the EV of a 16×16 block is smaller than the TV of 16×16 block is judged. If the EV of a 16×16 block is smaller than the TV, the 16×16 block is taken as the search block. If the EV is not smaller than the TV, it continues to judge whether the EVs of all the 8×8 blocks are smaller than the TV of 8×8 block. If the EVs of all the 8×8 blocks are smaller than the TV of 8×8 block, the amounts of EVDs between the EVs and the TV of the 8×16 blocks/the 16×8 blocks are computed, and the 8×16 block or the 16×8 block with the least EVD is selected as a search block. If there are more than one 8×8 blocks having the EV not smaller than the TV, the EVs of all the 8×8 blocks are judged one by one to decide whether the EVs of the 8×8 blocks are smaller than the TV of 8×8 block, wherein if there is a 8×8 block having the EV smaller than the TV, the 8×8 block is taken as a search block; otherwise, it continues to judge whether the EVs of all the 4×4 blocks are smaller the TV of 4×4 block. If the EVs of all the 4×4 blocks are smaller than the TV of 4×4 block, the 4×4 block is taken as a search block; if there is a 4×4 block having an EV not smaller than the TV, the EVDs between the EVs and the TV of the 4×8 blocks/the 8×4 blocks are computed, followed by taking the 4×8 block or the 8×4 block with the least EVD as a search block.

According to the method for motion search between video frames with multiple blocks described in an embodiment of the present invention, the EV of each 16×16 block is the sum of the EVs of the 16 4×4 blocks contained by the 16×16 block, while the EV of each 8×8 block is the sum of the EVs of the 4 4×4 blocks contained by the 8×8 block.

According to the method for motion search between video frames with multiple blocks described in an embodiment of the present invention, the step for motion searching includes the following steps. First, a small range pattern (SR pattern) is used to search a least-error block, wherein the SR pattern includes searching a center point and the four search points surrounding the center point, which are located at the upper side, the lower side, the left side and the right side of the center point. If the center point block is the least-error block, the center point block is judged as the final block and the searching is ended; if the center point block is not the least-error block, the center point is moved to a search point having the least-error block, followed by selecting a large range pattern (LR pattern) according to the moving direction. Next, the SR pattern is used again to search the least-error block, wherein the SR pattern includes the new center point and the three new-added search points surrounding the center point. If the center point block is the least-error block, the center point block is judged as the final block and the searching is ended; if the center point block is not the least-error block, the center point is moved to a search point having the least-error block. Afterwards, the LR pattern selected by the above-described step is used to search the least-error block. If the LR pattern is a vertical LR pattern and the least-error block is the block of one of the upper/lower search points, three search points surrounding the center point and located at the upper side or the lower side, the left side and the right side of the center point would be added; if the LR pattern is a vertical LR pattern and the least-error block is not the block of any of the upper/lower search points, four search points surrounding the center point and located at the upper-left side or upper-right side, the lower-left side or lower-right side, the upper side and the lower side of the center point would be added; if the LR pattern is a horizontal LR pattern and the least-error block is the block of one of the left/right search points, three search points surrounding the center point and located at the left side or the right side, the upper side and the lower side of the center point would be added; if the LR pattern is a horizontal LR pattern and the least-error block is not the block of any of the left/right search points, four search points surrounding the center point and located at the upper-left side or upper-right side, the lower-left side or lower-right side, the left side and the right side of the center point would be added. Finally, if the least-error block is not located at the center point, the LR pattern is repeatedly used to search the least-error block; if the least-error block is located at the center point, the SR pattern is used to search the least-error block. The least-error block is judged as the final block and the searching is ended.

According to the method for motion search between video frames with multiple blocks described in an embodiment of the present invention, the above-described vertical LR searching includes seven search points, which include a center point, two search points having a distance of 2 from the center point and located at the upper side and the lower side of the center point, and four search points having a distance of $\sqrt{2}$ from the center point and located at the upper-left side, the lower-left side, the upper-right side and the lower-right side of the center point.

According to the method for motion search between video frames with multiple blocks described in an embodiment of the present invention, the above-described horizontal LR searching includes seven search points, which includes a center point, two search points having a distance of 2 from the center point and located at the left side and the right side of the center point, and four search points having a distance of $\sqrt{2}$ from the center point and located at the upper-left side, the lower-left side, the upper-right side and the lower-right side of the center point.

According to the method for motion search between video frames with multiple blocks described in an embodiment of the present invention, the newly-added three search points of the above-described SR pattern are chosen in this way that if the center point is the search point located at the upper side of the original center point, three search points having a distance of 1 from the new center point and located at the upper side, the left side and the right side of the center point are added; if the center point is the search point located at the lower side of the original center point, three search points having a distance of 1 from the center point and located at the lower side, the left side and the right side of the center point are added; if the center point is the search point located at the left side of the original center point, three search points having a distance of 1 from the center point and located at the left side, the upper side and the lower side of the center point are added; if the center point is the search point located at the right side of the original center point, three search points having a distance of 1 from the center point and located at the right side, the upper side and the lower side of the center point are added.

According to the method for motion search between video frames with multiple blocks described in an embodiment of the present invention, the newly-added search points of the above-described vertical LR pattern are chosen in this way that if the center point is the search point located at the upper side of the original center point, three search points are added: one search point having a distance of 2 from the center point and located at the upper side of the center point, and two search points having a distance of $\sqrt{2}$ from the center point and located at the upper-left side and the upper-right side of the center point; if the center point is the search point located at the lower side of the original center point, three search points in total are added: one search point having a distance of 2 from the center point and located at the lower side of the center point, and two search points having a distance of $\sqrt{2}$ from the center point and located at the lower-left side and the lower-right side of the center point; if the center point is the search point located at the left side of the original center point, four search points are added: two search points having a distance of 2 from the center point and located at the upper side and the lower side of the center point, and two search points having a distance of $\sqrt{2}$ from the center point and located at the upper-left side and the lower-left side of the center point; and if the center point is the search point located at the right side of the original center point, four search points are added: two search points having a distance of 2 from the center point and located at the upper side and the lower side of the center point, and two search points having a distance of $\sqrt{2}$ from the center point and located at the upper-right side and the lower-right side of the center point.

According to the method for motion search between video frames with multiple blocks described in an embodiment of the present invention, the newly-added search points of the above-described horizontal LR pattern are chosen in this way that if the center point is the search point located at the left side of the original center point, three search points are added: one search point having a distance of 2 from the center point and located at the left side of the center point, and two search points having a distance of $\sqrt{2}$ from the center point and located at the upper-left side and the lower-left side of the center point; if the center point is the search point located at the right side of the original center point, three search points are added: one search point having a distance of 2 from the center point and located at the right side of the center point, and two search points having a distance of √2 from the center point and located at the upper-right side and the lower-right side of the center point; if the center point is the search point located at the upper side of the original center point, four search points are added: two search points having a distance of 2 from the center point and located at the left side and the right side of the center point, and two search points having a distance of √2 from the center point and located at the upper-left side and the upper-right side of the center point; and if the center point is the search point located at the lower side of the original center point, four search points are added: two search points having a distance of 2 from the center point and located at the left side and the right side of the center point, and two search points having a distance of √2 from the center point and located at the lower-left side and the lower-right side of the center point.

According to the method for motion search between video frames with multiple blocks described in an embodiment of the present invention, the newly-added three search points of the above-described repeatedly-used vertical LR pattern are chosen in this way that if the center point is the search point located at the upper side of the original center point, one search point having a distance of 2 from the center point and located at the upper side of the center point, and two search points having a distance of √2 from the center point and located at the upper-left side and the upper-right side of the center point are added; if the center point is the search point located at the lower side of the original center point, one search point having a distance of 2 from the center point and located at the lower side of the center point, and two search points having a distance of √2 from the center point and located at the lower-left side and the lower-right side of the center point are added; if the center point is the search point located at the upper-left side of the original center point, one search point having a distance of 2 from the center point and located at the upper side and two search points having a distance of √2 from the center point and located at the upper-left side and the lower-left side of the center point are added; if the center point is the search point located at the upper-right side of the original center point, one search point having a distance of 2 from the center point and located at the upper side of the center point, and two search points having a distance of √2 from the center point and located at the upper-right side and the lower-right side of the center point are added; if the center point is the search point located at the lower-left side of the original center point, one search point having a distance of 2 from the center point and located at the lower side and two search points having a distance of √2 from the center point and located at the upper-left side and the lower-left side of the center point are added; if the center point is the search point located at the lower-right side of the original center point, one search point having a distance of 2 from the center point and located at the lower side of the center point, and two search points having a distance of √2 from the center point and located at the upper-right side and the lower-right side of the center point are added.

According to the method for motion search between video frames with multiple blocks described in an embodiment of the present invention, the newly-added three search points of the above-described repeatedly-used horizontal LR pattern are chosen in this way that if the center point is the search point located at the left side of the original center point, one search point having a distance of 2 from the center point and located at the left side of the center point, and two search points having a distance of √2 from the center point and located at the upper-left side and the lower-left side of the center point are added; if the center point is the search point located at the right side of the original center point, one search point having a distance of 2 from the center point and located at the right side of the center point, and two search points having a distance of √2 from the center point and located at the upper-right side and the lower-right side of the center point are added; if the center point is the search point located at the upper-left side of the original center point, one search point having a distance of 2 from the center point and located at the left side and two search points having a distance of √2 from the center point and located at the upper-left side and the upper-right side of the center point are added; if the center point is the search point located at the upper-right side of the original center point, one search point having a distance of 2 from the center point and located at the right side of the center point, and two search points having a distance of √2 from the center point and located at the upper-left side and the upper-right side of the center point are added; if the center point is the search point located at the lower-left side of the original center point, one search point having a distance of 2 from the center point and located at the left side and two search points having a distance of √2 from the center point and located at the lower-left side and the lower-right side of the center point are added; if the center point is the search point located at the lower-right side of the original center point, one search point having a distance of 2 from the center point and located at the right side of the center point, and two search points having a distance of √2 from the center point and located at the lower-left side and the lower-right side of the center point are added.

According to the method for motion search between video frames with multiple blocks described in an embodiment of the present invention, the above-described step for selecting LR pattern includes: if the center point of the least-error block is the upper or the lower search point of the original center point, the object motion mode is judged as an up-down motion and a vertical LR pattern is selected as the LR pattern; and if the center point of the least-error block is the left or the right search point of the original center point, the object motion mode is judged as a left-right motion and a horizontal LR pattern is selected as the LR pattern.

According to the method for motion search between video frames with multiple blocks described in an embodiment of the present invention, the above-described step for transforming the LR pattern into the SR pattern includes: adding four search points surrounding the center point, having a distance of 1 from the center point and located at the upper side, the lower side, the left side and the right side of the center point; computing the error values; taking the search point block having the least error value as the final block; ending the searching.

Since the present invention uses EVs to judge the block configuration in use and takes advantage of the distribution characteristics of the motion vectors, the drawback of the hexagon-based search algorithm (HEXBS-algorithm) is overcome. Furthermore, by using the LR pattern repeatedly, it contributes to speed up the process of searching the target point of the least-error block. Therefore, the present invention is able to largely reduce the number of search points required by the searching and to achieve the goal of increasing the search speed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 2:
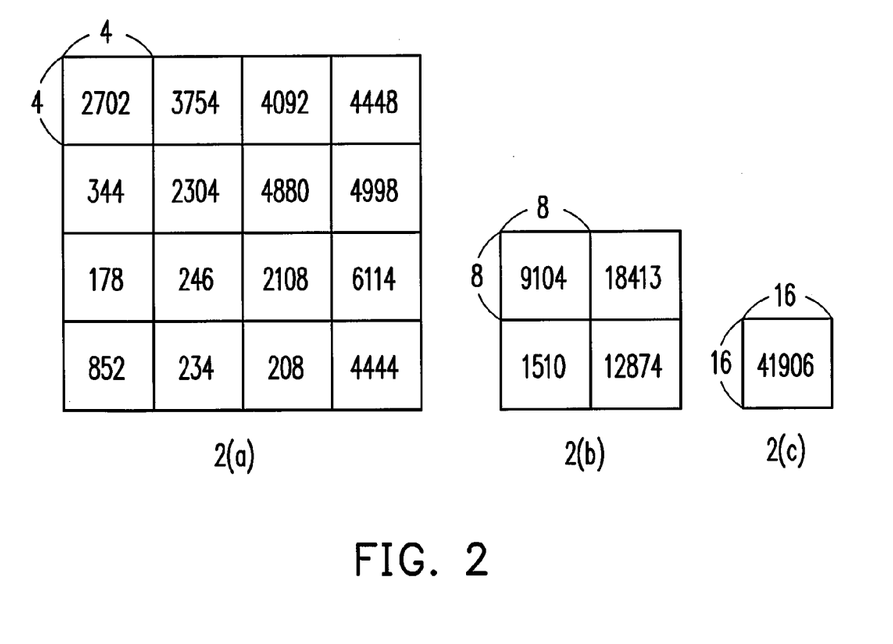
FIG. 2 illustrates an example of computing the edge values of video frames according to an embodiment of the present invention.
Figure 3:
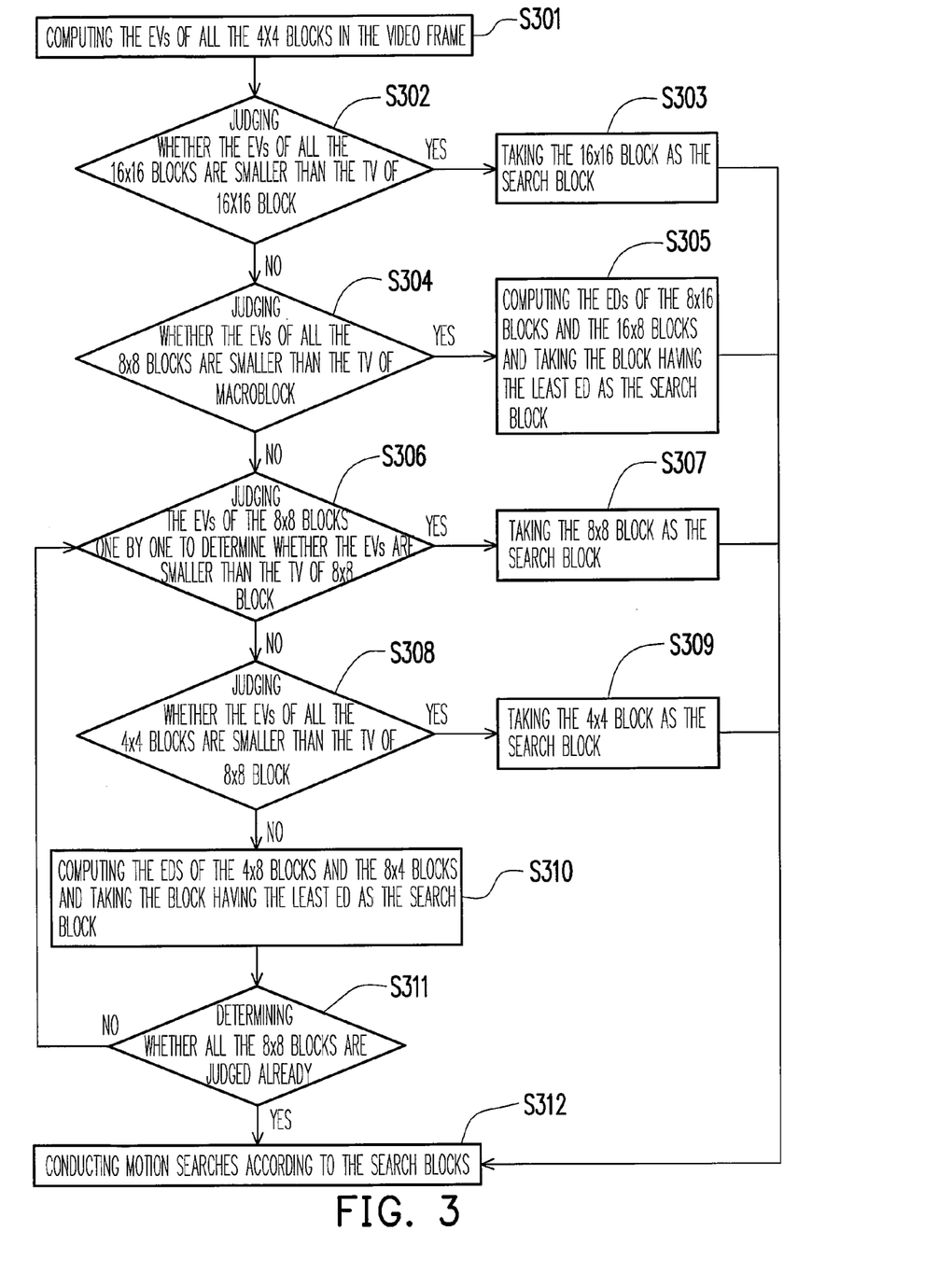
FIG. 3 is the flowchart of a method for motion searching between video frames with multiple blocks according to an embodiment of the present invention.

FIG. 2 illustrates an example of computing the edge values of video frames according to an embodiment of the present invention and FIG. 3 is the flowchart of a method for motion searching between video frames with multiple blocks according to an embodiment of the present invention. Referring to FIGS. 2 and 3, the video frame in the embodiment includes 16 4×4 blocks in total (as shown in FIG. 2(*a*)). The detailed steps of the method for motion search between video frames with multiple blocks according to the present embodiment are described as follows.

First, the EVs of all the 4×4 blocks within the video frame are computed (step S301), which is performed by using, for example, Sobel filter. The computation formulas thereof are:

$$dx_{i,j} = P_{i-1,j+1} + 2 \times P_{i,j+1} P_{i+1,j+1} - P_{i-1,j-1} - 2 \times P_{i,j-1} - P_{i+1,j-1}$$

$$dy_{i,j} = P_{i-1,j+1} + 2 \times P_{i-1,j} + P_{i-1,j+1} - P_{i-1,j-1} - 2 \times P_{i,j-1} - P_{i+1,j-1}$$

wherein, $dx_{i,j}$ and $dy_{i,j}$ respectively represent the pixel difference values in the x axis direction and the y axis direction of a pixel P in the i-th row and the j-th column in a 4×4 block of the video frame, while the EV of a 4×4 block is computed by:

$$EdgeValue_{4\times4} = \sum_{j=0}^{3} \sum_{i=0}^{3} (|dx_{i,j}| - |dy_{i,j}|)$$

The figure in each block of FIG. 2(*a*) represents the EV of the 4×4 block. Thus, after accumulating the EVs of a set of four adjacent blocks residing at the upper-left portion, the lower-left portion, the upper-right portion and the lower-right portion, the EVs corresponding to the 8×8 block are obtained (as shown by FIG. 2(*b*)). Further, after accumulating the EVs of four 8×8 blocks, the EV corresponding to the 16×16 block is obtained (as shown by FIG. 2(*c*)).

Figure 4:
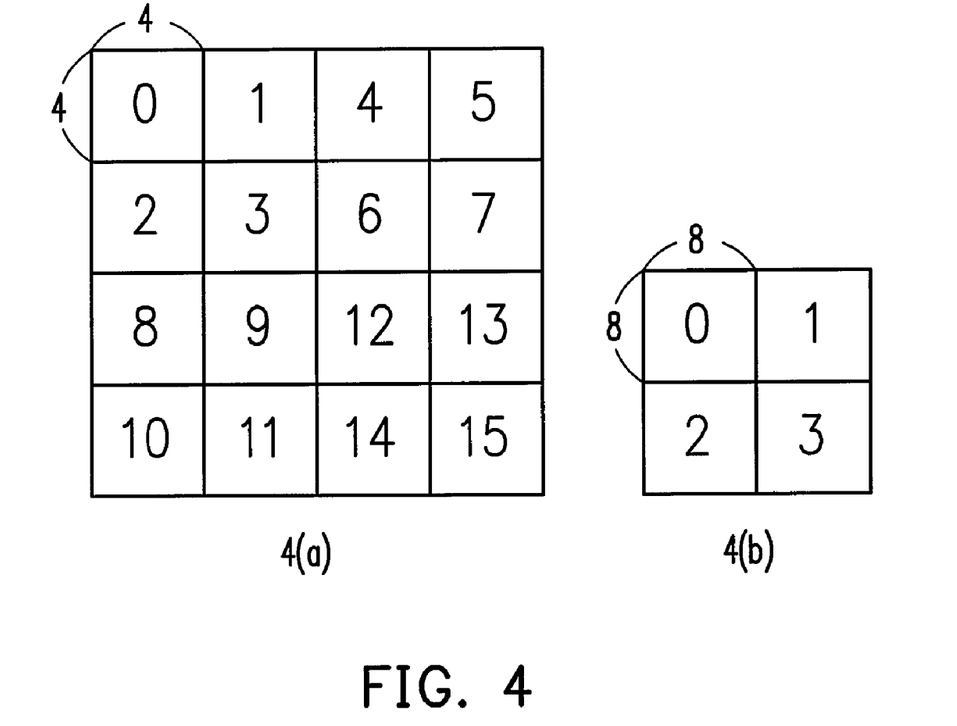
FIG. 4 illustrates an example of computing the edge values of blocks and the edge value differences according to an embodiment of the present invention.

FIG. 4 illustrates an example of computing the edge values of blocks and the edge value differences according to an embodiment of the present invention. Referring to FIG. 4(*a*), 16 4×4 blocks are included, and every 4×4 block is numbered according to its location. According to the numbers, the formulas to compute the EVs of the 16×16 block and the 8×8 blocks thereof are derived as follows:

$$EdgeValue_{16\times16} = \sum_{0}^{15} EdgeValue_{4\times4}$$

$$EdgeValue_{8\times8}(0) = \sum_{0}^{3} EdgeValue_{4\times4}$$

$$EdgeValue_{8\times8}(1) = \sum_{4}^{7} EdgeValue_{4\times4}$$

$$EdgeValue_{8\times8}(2) = \sum_{8}^{11} EdgeValue_{4\times4}$$

$$EdgeValue_{8\times8}(3) = \sum_{12}^{15} EdgeValue_{4\times4}$$

Wherein, the number in the brackets is just the number of the 8×8 block (as shown by FIG. 4(*b*)). In addition, in the embodiment the edge differences (EDs) of 16×8 blocks, 8×16 blocks, 8×4 blocks and 4×8 blocks are required to be computed as follows:

for the ED of the 16×8 blocks, $ED_{16\times8}$=|EdgeValue$_{8\times8}$(0)−EdgeValue$_{8\times8}$(1)|+|EdgeValue$_{8\times8}$(2)−EdgeValue$_{8\times8}$(3)| for the ED of the 8×16 blocks, $ED_{8\times16}$=|EdgeValue$_{8\times8}$(0)−EdgeValue$_{8\times8}$(2)|+|EdgeValue$_{8\times8}$(1)−EdgeValue$_{8\times8}$(3)| for the EDs of the 8×4 blocks, $ED_{8\times4}$(0)=|EdgeValue$_{4\times4}$(0)−EdgeValue$_{4\times4}$(1)|+|EdgeValue$_{4\times4}$(2)−EdgeValue$_{4\times4}$(3)|

$ED_{8\times4}$(1)=|EdgeValue$_{4\times4}$(4)−EdgeValue$_{4\times4}$(5)|+|EdgeValue$_{4\times4}$(6)−EdgeValue$_{4\times4}$(7)|

$ED_{8\times4}$(2)=|EdgeValue$_{4\times4}$(8)−EdgeValue$_{4\times4}$(9)|+|EdgeValue$_{4\times4}$(10)−EdgeValue$_{4\times4}$(11)|

$ED_{8\times4}$(3)=|EdgeValue$_{4\times4}$(12)−EdgeValue$_{4\times4}$(13)|30|EdgeValue$_{4\times4}$(14)−EdgeValue$_{4\times4}$(15)| for the EDs of the 4×8 blocks, $ED_{4\times8}$(0)=|EdgeValue$_{4\times4}$(0)−EdgeValue$_{4\times4}$(2)|+|EdgeValue$_{4\times4}$(1)−EdgeValue$_{4\times4}$(3)|

$ED_{4\times8}$(1)=|EdgeValue$_{4\times4}$(4)−EdgeValue$_{4\times4}$(6)|+|EdgeValue$_{4\times4}$(5)−EdgeValue$_{4\times4}$(7)|

$ED_{4\times8}$(2)=|EdgeValue$_{4\times4}$(8)−EdgeValue$_{4\times4}$(10)|+|EdgeValue$_{4\times4}$(9)−EdgeValue$_{4\times4}$(11)|

$ED_{4\times8}$(3)=|EdgeValue$_{4\times4}$(12)−EdgeValue$_{4\times4}$(14)|+|EdgeValue$_{4\times4}$(13)−EdgeValue$_{4\times4}$(15)|

Next, whether the EVs of all the 16×16 blocks are smaller than the TV of 16×16 block is judged (step S302). If the EV of the 16×16 block is smaller than the TV, the 16×16 block is selected as a search block (step S303); otherwise, it goes on to judge whether the EVs of all the 8×8 blocks are smaller than the TV of the macroblock (step S304). Wherein, it is assumed in the embodiment that the TV of 16×16 block is 30000, the TV of macroblock (i.e. 16×8 block or 8×16 block) is 10000, the TV of 8×8 block is 15000 and the TV of 4×4 block is 5000.

Referring to FIG. 2(c), it can be seen that the EV of the 16×16 block is larger than the TV of 16×16 block, thus, it goes on to judge whether the EVs of all the 8×8 blocks are smaller than the TV of macroblock. If the EVs of all the 8×8 blocks are smaller than the TV of macroblock, the EDs of the 8×16 blocks and the 16×8 blocks are computed and the block with the least EV is taken as the search block (step S305).

If there are more than one 8×8 blocks having an EV not smaller than the TV of macroblock, whether the EVs of all the 8×8 blocks are smaller than the TV of 8×8 block is judged one by one (step S306). Referring to FIG. 2(b), it can be seen that in the embodiment there are two 8×8 blocks having EVs larger than the TV of macroblock. Therefore, whether the EVs of all the 8×8 blocks are smaller than the TV of 8×8 block is judged one by one.

In the meantime, if the EV of a 8×8 block is smaller than the TV of 8×8 block, the 8×8 block is taken as the search block (step S307); otherwise, it goes on to judge whether the EVs of all the 4×4 blocks are smaller than the TV of 4×4 block (step S308).

Afterwards, the EVs of the 4 8×8 blocks are judged one by one to decide whether the EVs are smaller than the TV of 8×8 block, wherein the EV of the first 8×8 block (corresponding to the upper-left corner in FIG. 2(b)) is determined to be smaller than the TV of 8×8 block, thus, the optimal configuration thereof is 8×8 and an 8×8 block is taken as the search block.

The EV of the second 8×8 block is larger than the TV of 8×8 block. Therefore, the EVs of the 4×4 blocks contained in the 8×8 block have to be compared. Meanwhile, if the EVs of all the 4×4 blocks contained in the 8×8 block are smaller than the TV of 4×4 block, the 4×4 block is taken as the search block (step S309); if there are more than one 4×4 blocks having the EVs not smaller than the TV of 4×4 block, the edge difference (ED) of the 4×8 blocks and the 8×4 blocks is computed, and the block having the least ED is taken as the search block (step S310).

Since the EVs of the 4 4×4 blocks in the second 8×8 block are smaller than the TV of 4×4 block, the EDs thereof are required to be compared. The equations of ED described hereinbefore are used to obtain the EDs of the 8×4 block and 4×8 block, wherein the ED of the 8×4 block is 474 and the ED of the is 1338. Therefore, the optimal configuration of the 8×8 blocks is determined to be 8×4 and the 8×4 block is taken as the search block.

Since the EV of the third 8×8 block is smaller than the TV of 8×8 block, the optimal configuration thereof is determined to be 8×8 and the 8×8 block is taken as the search block. On the other hand, the EV of the fourth 8×8 block is larger than the TV of 8×8 block, the EVs of the 4×4 blocks are needed to be compared. However, not all the EVs of the four 4×4 blocks thereof are smaller than the TV of 4×4 block (i.e., for example, the EV of the 4×4 block residing at the upper-right corner of the 8×8 block is 6114, which is larger than the TV, 5000, of 4×4 block), the optimal configuration of the block is accordingly determined to be 4×4 and the 4×4 block is taken as the search block.

Finally, whether all the 8×8 blocks are judged is determined (step S311). If one or more than one 8×8 blocks are not judged, it goes back to step S306, followed by judging the next 8×8 block; if all the 8×8 blocks are judged, it begins with a motion search on the search block (step S312).

In the embodiment, the EVs of various blocks are used to judge and determine the adopted block configuration. The surrounding areas are utilized to predict the hexagon shape and the direction of the object motion. Therefore, the present invention is able to effectively advance the searching speed for motion estimation between the frames in an image compression system. The detailed flowchart of motion searches by using the obtained search block hereinbefore is explained as follows.

Figure 5:
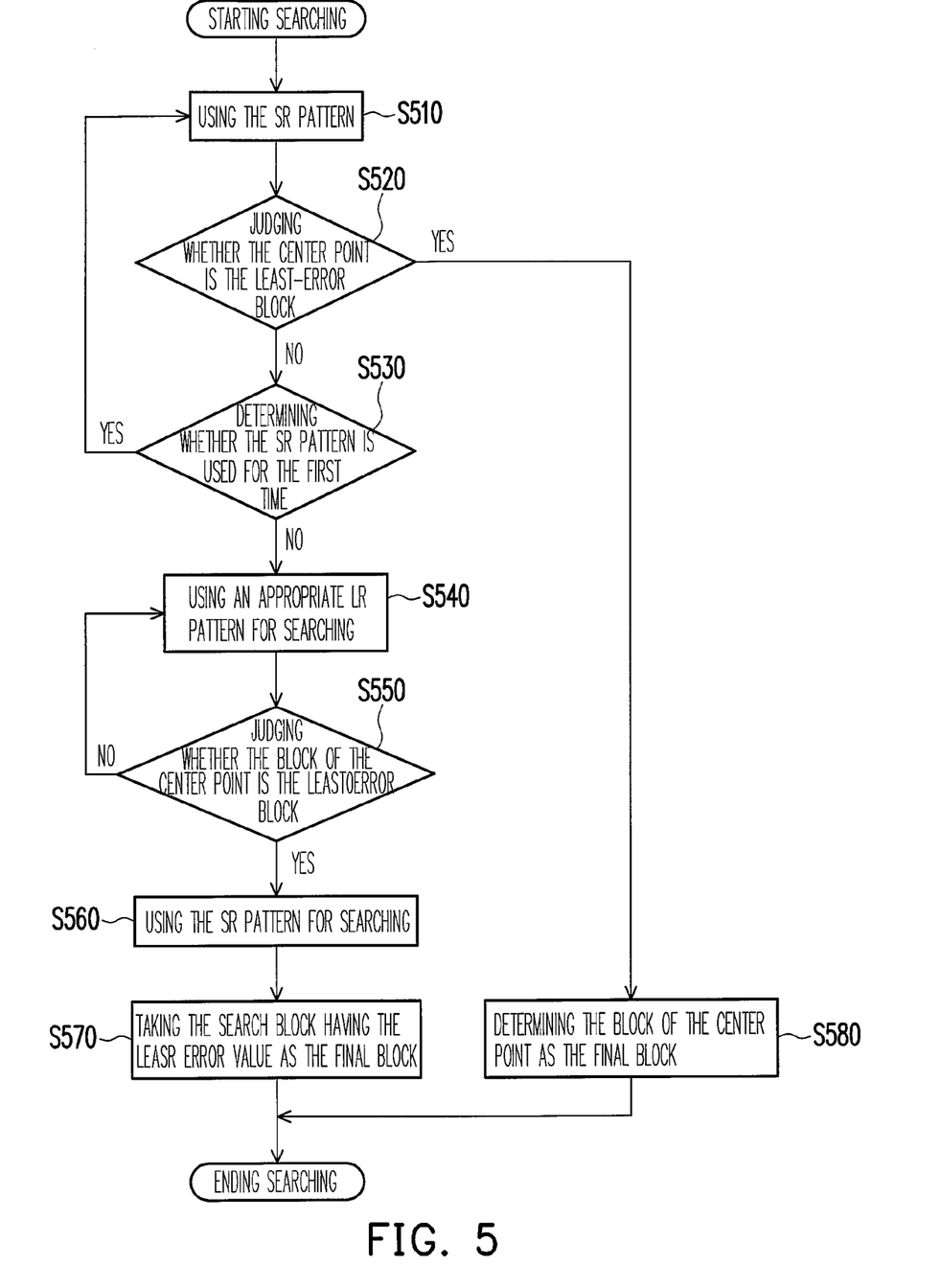
FIG. 5 is the flowchart of a method for motion searching between video frames according to an embodiment of the present invention.

FIG. 5 is the flowchart of a method for motion searching between video frames according to an embodiment of the present invention. The present embodiment adopts an algorithm where the SR pattern is used twice continuously, followed by using the LR pattern and then back to use the SR pattern. If a center-point block is judged as the least-error block after comparison, the center-point block is determined as the final block and the search operations are ended. By using the algorithm, the amount of searching points can be largely reduced and the searching process can be speeded up.

Figure 6:
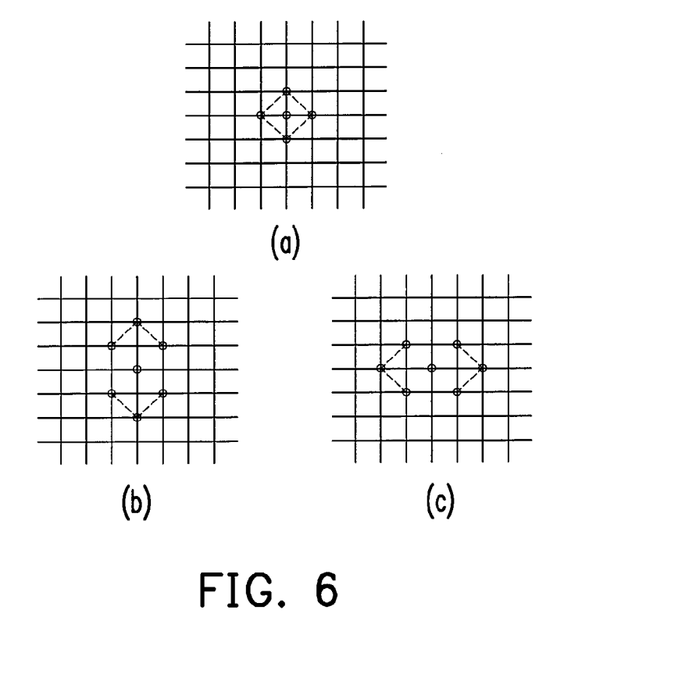
FIG. 6 is diagrams showing a small range pattern (SR pattern), a vertical large range pattern (vertical LR pattern) and a horizontal large range pattern (horizontal LR pattern) according to an embodiment of the present invention.

First, an SR pattern is used to search the least-error block (step S510). As shown by the SR pattern in FIG. 6(a), in addition to the center point, the search points also include four search points having a distance of 1 from the center point and located at the upper side, the lower side, the left side and the right side of the center point respectively.

Next, whether the center point is the least-error block is judged (step S520). If the center-point block is judged as the least-error block, the least-error block is determined as the final block (step S580) and the search operations are ended; if the center-point block is judged not as the least-error block, the search point of the least-error block is selected as a new center point.

Afterwards, whether it is the first time to use the SR pattern is judged (step S530). If the SR pattern is used only once, it goes back to step S510 to use the SR pattern to search the least-error block again. Wherein, as the SR pattern is used for the second times, three search points are added. The positions of the newly-added search points are determined in this way: if the new center point is the search point located at the upper side of the original center point, the three newly-added search points are the ones having a distance of 1 from the new center point and located at the upper side, the left side and the right side of the new center point; if the new center point is the search point located at the lower side of the original center point, the positions of the three newly-added search points are the ones having a distance of 1 from the new center point and located at the lower side, the left side and the right side of the new center point; if the new center point is the search point located at the left side of the original center point, the positions of the three newly-added search points are the ones having a distance of 1 from the new center point and located at the left side, the upper side and the lower side of the new center point; if the new center point is the search point located at the right side of the original center point, the positions of the three newly-added search points are the ones having a distance of 1 from the new center point and located at the right side, the upper side and the lower side of the new center point.

In addition, if the SR pattern has been used twice, the search point of the least-error block is selected as the new center point and an LR pattern is selected according to the moving direction. Wherein, the LR pattern includes a vertical LR pattern and a horizontal LR pattern. The vertical LR pattern includes seven search points as shown by the vertical LR pattern in FIG. 6(b), which includes a center point, two search points having a distance of 2 from the center point and located at the upper side and the lower side of the center point and four search points having a distance of $\sqrt{2}$ from the center point and located at the upper-left side, the lower-left side, the upper-right side and the lower-right side of the center point; On the other hand, the horizontal LR pattern includes seven search points as shown by the horizontal LR pattern in FIG. 6(c), which includes a center point, two search points having a distance of 2 from the center point and located at the left side and the right side of the center point and four search points having a distance of $\sqrt{2}$ from the center point and located at the upper-left side, the lower-left side, the upper-right side and the lower-right side of the center point.

The method for selecting the above-described LR pattern is that if the center point of the least-error block is the upper search point or the lower search point of the original center point, the object motion mode is judged as an up-down motion and a vertical LR pattern is selected as the LR pattern; if the center point of the least-error block is the left search point or the right search point of the original center point, the object motion mode is judged as a left-right motion and a horizontal LR pattern is selected as the LR pattern.

Furthermore, the LR pattern selected through the previous step is used for searching the least-error block (step S540). If a vertical LR pattern is used, 3~4 search points are added. The positions of the newly-added search points are determined in this way: if the new center point is the search point located at the upper side of the original center point, three newly-added search points include a point having a distance of 2 from the new center point and located at the upper side of the new center point and two points having a distance of $\sqrt{2}$ from the new center point and located at the upper-left side and the upper-right side of the new center point; if the new center point is the search point located at the lower side of the original center point, the three newly-added search points include a point having a distance of 2 from the new center point and located at the lower side of the new center point and two points having a distance of $\sqrt{2}$ from the new center point and located at the lower-left side and the lower-right side of the new center point; if the new center point is the search point located at the left side of the original center point, four newly-added search points include two points having a distance of 2 from the new center point and located at the upper side and the lower side of the new center point and two points having a distance of $\sqrt{2}$ from the new center point and located at the upper-left side and the lower-left side of the new center point; if the new center point is the search point located at the right side of the original center point, the four newly-added search points include two points having a distance of 2 from the new center point and located at the upper side and the lower side of the new center point and two points having a distance of $\sqrt{2}$ from the new center point and located at the upper-right side and the lower-right side of the new center point.

If a horizontal LR pattern is used, 3~4 search points are added as well. The positions of the newly-added search points are determined in this way: if the new center point is the search point located at the left side of the original center point, three newly-added search points include a point having a distance of 2 from the new center point and located at the left side of the new center point and two points having a distance of $\sqrt{2}$ from the new center point and located at the upper-left side and the lower-left side of the new center point; if the new center point is the search point located at the right side of the original center point, the three newly-added search points include a point having a distance of 2 from the new center point and located at the right side of the new center point and two points having a distance of $\sqrt{2}$ from the new center point and located at the upper-right side and the lower-right side of the new center point; if the new center point is the search point located at the upper side of the original center point, four newly-added search points include two points having a distance of 2 from the new center point and located at the left side and the right side of the new center point and two points having a distance of $\sqrt{2}$ from the new center point and located at the upper-left side and the upper-right side of the new center point; if the new center point is the search point located at the lower side of the original center point, the four newly-added search points include two points having a distance of 2 from the new center point and located at the left side and the right side of the new center point and two points having a distance of $\sqrt{2}$ from the new center point and located at the lower-left side and the lower-right side of the new center point.

Moreover, the error values of the search points are respectively computed, following by judging whether the center-point block is the least-error block (step S550). If the center-point block is judged not as the least-error block, the search point of the least-error block is selected as a new center point, followed by repeatedly using the LR pattern for searching the least-error block.

When the vertical LR pattern is repeatedly used at the point, three search points are added. The positions of the newly-added search points are determined in this way: if the new center point is the search point located at the upper side of the original center point, three newly-added search points include a point having a distance of 2 from the new center point and located at the upper side of the new center point and two points having a distance of $\sqrt{2}$ from the new center point and located at the upper-left side and the upper-right side of the new center point; if the new center point is the search point located at the lower side of the original center point, the three newly-added search points include a point having a distance of 2 from the new center point and located at the lower side of the new center point and two points having a distance of $\sqrt{2}$ from the new center point and located at the lower-left side and the lower-right side of the new center point; if the new center point is the search point located at the upper-left side of the original center point, the three newly-added search points include a point having a distance of 2 from the new center point and located at the upper side of the new center point and two points having a distance of $\sqrt{2}$ from the new center point and located at the upper-left side and the lower-left side of the new center point; if the new center point is the search point located at the upper-right side of the original center point, the three newly-added search points include a point having a distance of 2 from the new center point and located at the upper side of the new center point and two points having a distance of $\sqrt{2}$ from the new center point and located at the upper-right side and the lower-right side of the new center point; if the new center point is the search point located at the lower-left side of the original center point, the three newly-added search points include a point having a distance of 2 from the new center point and located at the lower side of the new center point and two points having a distance of $\sqrt{2}$ from the new center point and located at the upper-left side and the lower-left side of the new center point; if the new center point is the search point located at the lower-right side of the original center point, the three newly-added search points include a point having a distance of 2 from the new center point and located at the lower side of the new center point and two points having a distance of $\sqrt{2}$ from the new center point and located at the upper-right side and the lower-right side of the new center point.

When the horizontal LR pattern is repeatedly used at the point, three search points are added as well. The positions of the newly-added search points are determined in this way: if the new center point is the search point located at the left side of the original center point, three newly-added search points include a point having a distance of 2 from the new center point and located at the left side of the new center point and two points having a distance of √2 from the new center point and located at the upper-left side and the lower-left side of the new center point; if the new center point is the search point located at the right side of the original center point, the three newly-added search points include a point having a distance of 2 from the new center point and located at the right side of the new center point and two points having a distance of √2 from the new center point and located at the upper-right side and the lower-right side of the new center point; if the new center point is the search point located at the upper-left side of the original center point, the three newly-added search points include a point having a distance of 2 from the new center point and located at the left side of the new center point and two points having a distance of √2 from the new center point and located at the upper-left side and the upper-right side of the new center point; if the new center point is the search point located at the upper-right side of the original center point, the three newly-added search points include a point having a distance of 2 from the new center point and located at the right side of the new center point and two points having a distance of √2 from the new center point and located at the upper-left side and the upper-right side of the new center point; if the new center point is the search point located at the lower-left side of the original center point, the three newly-added search points include a point having a distance of 2 from the new center point and located at the left side of the new center point and two points having a distance of √2 from the new center point and located at the lower-left side and the lower-right side of the new center point; if the new center point is the search point located at the lower-right side of the original center point, the three newly-added search points include a point having a distance of 2 from the new center point and located at the right side of the new center point and two points having a distance of √2 from the new center point and located at the lower-left side and the lower-right side of the new center point.

In addition, when conducting step S550 for judgments, if the center-point block is determined as the least-error block, the SR pattern is used instead of the LR pattern (step S560). Four search points having a distance of 1 from the center point and located at the upper side, the lower side, the left side and the right side of the center point respectively are added, and the error values are computed. Finally, the block of the search point having the least error value is taken as the final block (step S570) and the searching is ended.

Figure 7:
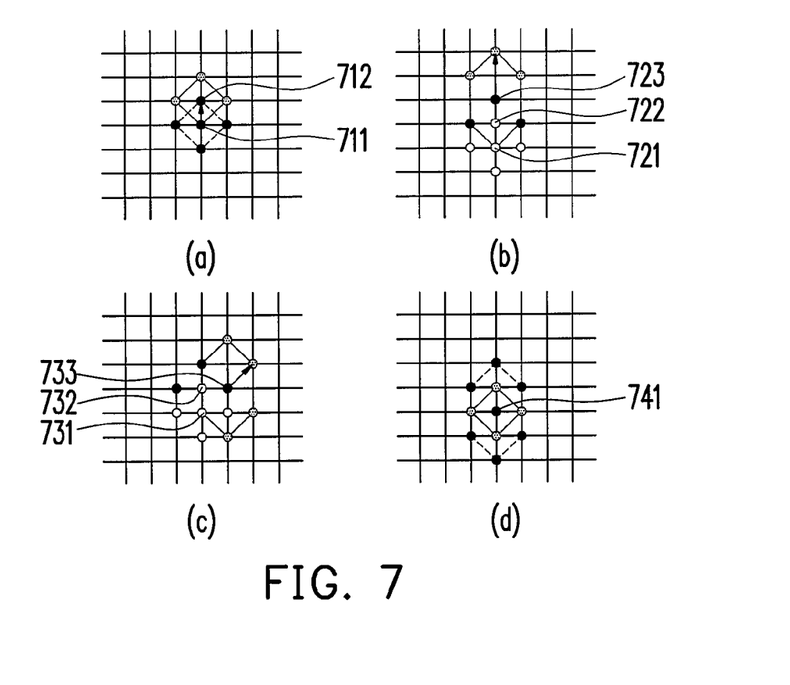
FIG. 7 illustrates an example of a transformation between a small range pattern (SR pattern) and a large range pattern (LR pattern) according to an embodiment of the present invention.

FIG. 7 illustrates an example of a transformation between a small range pattern (SR pattern) and a large range pattern (LR pattern) according to an embodiment of the present invention. Wherein, FIG. 7(a) is an example for transforming from a SR pattern into another SR pattern. When the SR pattern is used for the first time, the block of the search point 712 located at the upper side of the center point 711 is judged as the least-error block by computation. Thus, the search point 712 is selected as the new center point, followed by using the SR pattern and adding three search points having a distance of 1 from the center point 712 and located at the upper side, the left side and the right side of the center point 712 as shown in the figure.

FIG. 7(b) is an example for transforming from a SR pattern into a vertical LR pattern. When the SR pattern is used for the first time, the block of the search point 722 located at the upper side of the center point 721 is judged as the least-error block by computation. Thus, the search point 722 is selected as the new center point, followed by using the SR pattern and adding three search points having a distance of 1 from the center point 722 and located at the upper side, the left side and the right side of the center point 722 as shown in the figure. After that, the block of the search point 723 located at the upper side of the center point 722 is judged as the least-error block by computation. Thus, the search point 723 is selected as the new center point, followed by using the vertical LR pattern and adding one search point having a distance of 2 from the center point 723 and located at the upper side of the center point 723 and two search points having a distance of √2 from the center point 723 and located at the upper-left side and the upper-right side of the center point 723 as shown in the figure.

FIG. 7(c) is another example for transforming from a SR pattern into a vertical LR pattern. When the SR pattern is used for the first time, the block of the search point 731 located at the upper side of the center point is judged as the least-error block by computation. Thus, the search point 732 is selected as the new center point, followed by using the SR pattern and adding three search points having a distance of 1 from the new center point 732 and located at the upper side, the left side and the right side of the center point 732. After that, the block of the search point 733 located at the right side of the center point 732 is judged as the least-error block by computation. Thus, the search point 733 is selected as the new center point, followed by using the vertical LR pattern and adding two search points having a distance of 2 from the center point 733 and located at the upper side and the lower side of the center point 733 and two search points having a distance of √2 from the center point 733 and located at the upper-right side and the lower-right side of the center point 723.

FIG. 7(d) is an example for transforming from a vertical LR pattern into an SR pattern. When using the vertical LR pattern, the block of the center point 741 is judged as the least-error block by computation. Thus, it is transformed into the SR pattern and four search points having a distance of 1 from the center point 741 and located at the upper side, the lower side, the left side and the right side of the center point 741 are added.

Figure 8:
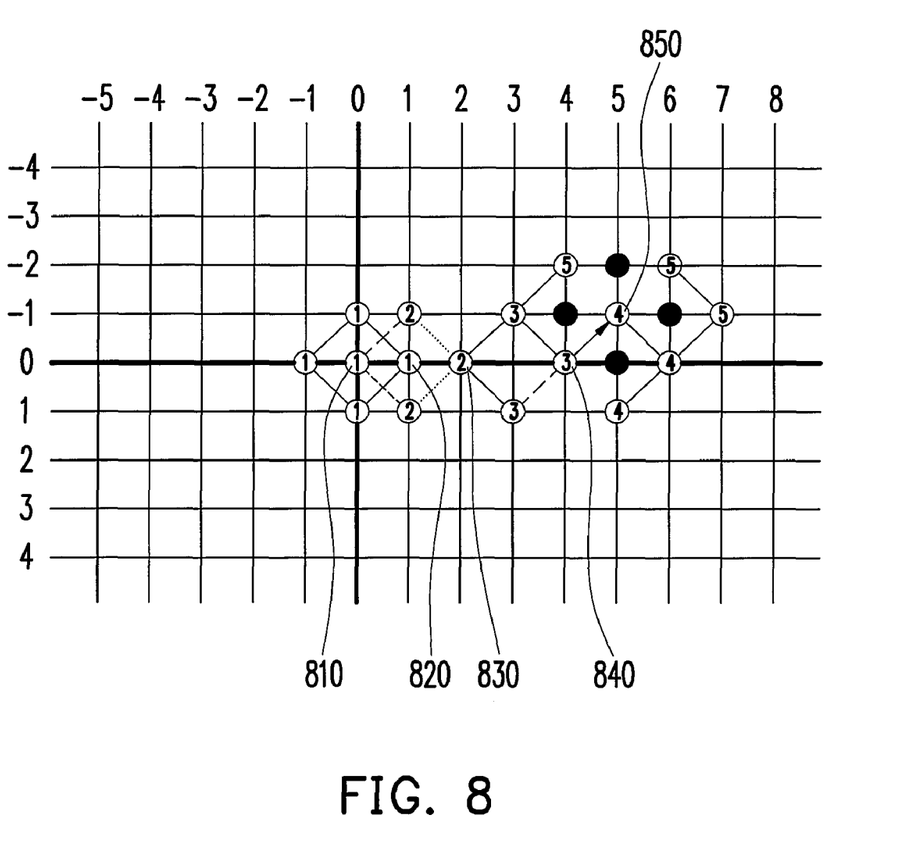
FIG. 8 illustrates an example of the method for motion searching between video frames according to an embodiment of the present invention.

FIG. 8 illustrates an example of the method for motion searching between video frames with multiple blocks according to an embodiment of the present invention. When the SR pattern is used for the first time, four search points (marked by number 1) having a distance of 1 from the center point 810 and located at the upper side, the lower side, the left side and the right side of the center point 810 are added. After that, the block of the search point 820 located at the right side of the center point 810 is judged as the least-error block by computation. Thus, the search point 820 is selected as the new center point.

Afterwards, the SR pattern is used and three search points (marked by number 2) having a distance of 1 from the center point 820 and located at the right side, upper side and the lower side of the center point 820 are added. After that, the block of the search point 830 located at the right side of the center point 820 is judged as the least-error block by computation. Thus, the search point 830 is selected as the new center point.

Then, the horizontal LR pattern is used and three search points (marked by number 3) including a search point having a distance of 2 from the center point 830 and located at the right side of the center point 830 and two search points having a distance of √2 from the center point 830 and located upper-right side and the lower-right side of the center point 830 are added. After that, the block of the search point 840 located at the right side of the center point 830 is judged as the least-error block by computation. Thus, the search point 840 is selected as the new center point.

Again, the horizontal LR pattern is used and three search points (marked by number 4) including a search point having a distance of 2 from the center point 840 and located at the right side of the center point 840 and two search points having a distance of √2 from the center point 840 and located upper-right side and the lower-right side of the center point 840 are added. Finally, the block of the search point 850 located at the upper-right side of the center point 840 is judged as the least-error block by computation. Thus, the search point 850 is selected as the new center point.

Furthermore, the horizontal LR pattern is used again and four search points (marked by number 5) including two search points having a distance of 2 from the center point 850 and located at the left side and the right side of the center point 850 and two search points having a distance of $\sqrt{2}$ from the center point 850 and located upper-left side and the upper-right side of the center point 850 are added. After that, the block of the center point 850 is judged as the least-error block by computation.

Finally, the SR pattern is used and four search points having a distance of 1 from the center point 850 and located at the upper side, the lower side, the left side and the right side of the center point 850 are added. After that, the block of the center point 850 is judged as the least-error block by computation. Thus, the block of the center point 850 is judged as the final block and the searching operations are ended.

Table 1 lists the numbers of search points for searching multiple sets of video frames by using different searching methods according to the embodiment of the present invention. Wherein, the search range thereof is an area occupying 16 pixels in both the left side and the right side and in both the upper side and the lower side of the center point. The reference frames are the five consecutive frames and the searching is performed by using 4×4 blocks. It can be seen from the table that the numbers of search points of the present invention are less than the other methods by around 75%~98%. In table 2, the searching speed between the present invention and other methods is compared. It can be seen from the table 2 that the searching speed of the present invention is faster than the other searching methods by around 70%~98%.

In summary, according to the method for motion search between video frames with multiple blocks of the present invention, EVs are used to determine the adopted blocks, the surrounding area is used to predict the shape of hexagons and the moving direction of objects, and the distribution characteristics of the motion vector is adopted, which enable the algorithm of the present invention to have less search points during searching, such that the hexagon-based search algorithm (HEXBS algorithm) in the prior art is improved. The experiments have proved that, without affecting the compressed video quality, the present invention reduces the number of search points by about 58% in comparison with the diamond search algorithm (DS algorithm) and by about 53% in comparison with the HEXBS algorithm. The advantages make the present invention suitable for the realizing real-time image compressions.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:
1. A method for motion search between video frames with multiple blocks, comprising the following steps:
   computing the edge values (EVs) of a plurality of blocks in a video frame, comprising:
      computing the EVs of all the 4×4 blocks in the video frame; and
      using the EVs of the 4×4 blocks to compute the EVs of all of a plurality of 8×8 blocks and a 16×16 block,

TABLE 1

|       | Night (720 × 480) | Sailormen (720 × 480) | Crew (720 × 480) | Harbour (720 × 480) | Coastguard (352 × 288) | Stefan (352 × 288) |
|-------|-------------------|-----------------------|------------------|---------------------|------------------------|--------------------|
| FS    | 241997.58         | 241997.58             | 241997.58        | 241997.58           | 241997.58              | 241997.58          |
| DS    | 4282.722          | 4594.312              | 4627.141         | 3945.963            | 3918.376               | 3804.037           |
| HEXBS | 3258.385          | 3745.198              | 3521.157         | 3274.705            | 3225.094               | 3136.55            |
| PHS   | 2352.327          | 2796.472              | 2711.830         | 2263.762            | 2196.878               | 2167.096           |
| EDPHS | 120.898           | 152.968               | 63.916           | 287.28              | 237.08                 | 404.45             |

|       | Silent (352 × 288) | Weather (352 × 288) | Tennis (176 × 144) | Foreman (176 × 144) | Salesman (176 × 144) | Mobile (176 × 144) |
|-------|--------------------|---------------------|--------------------|---------------------|----------------------|--------------------|
| FS    | 241997.58          | 241997.58           | 241997.58          | 241997.58           | 241997.58            | 241997.58          |
| DS    | 3212.921           | 2895.779            | 3487.197           | 3742.133            | 2931.016             | 3432.631           |
| HEXBS | 2732.830           | 2603.785            | 2992.038           | 3113.066            | 2648.269             | 2996.991           |
| PHS   | 1503.139           | 1236.635            | 1794.210           | 2148.029            | 1229.164             | 1845.757           |
| EDPHS | 61.86              | 185.54              | 374.42             | 623.52              | 139.99               | 746.44             |

TABLE 2

|                                    | Night | Sailormen | Crew | Harbour | Coastguard | Stefan | Silent | Weather | Tennis | Foreman | Salesman | Mobile |
|------------------------------------|-------|-----------|------|---------|------------|--------|--------|---------|--------|---------|----------|--------|
| Avg. speedup over DS by EDPHS (%)  | 97.2  | 96.7      | 98.7 | 92.8    | 94         | 89.4   | 98.2   | 93.7    | 89.3   | 83.4    | 95.3     | 79     |
| Avg. speedup over HEXBS by EDPHS (%)| 96.4 | 96        | 98.3 | 91.3    | 92.7       | 87.2   | 97.8   | 92.9    | 87.5   | 80      | 94.8     | 75.2   |
| Avg. speedup over PHS by EDPHS (%) | 94.9  | 94.6      | 97.7 | 91.3    | 90.3       | 81.4   | 96     | 85.1    | 80     | 71      | 88.7     | 60     | wherein the EV of each of the 4×4 blocks is calculated according to pixel difference values of each of a plurality of pixels within each of the 4×4 blocks;

judging whether the EVs of the blocks are smaller than a threshold value (TV), wherein if there is one of the blocks having an EV smaller than the TV, the block is taken as a search block;

if there is no block having an EV smaller than the TV, the edge difference (ED) between the EVs of the blocks and the TV are computed and the block having the least ED is taken as the search block; and conducting a searching step of motion search according to the search block.

2. The method for motion search between video frames with multiple blocks as recited in claim 1, wherein the step for judging whether the EVs of the blocks are smaller than the TV comprises:

judging whether the EV of the 16×16 block is smaller than the TV of 16×16 block;

if the EV of the 16×16 block is smaller than the TV of 16×16 block, taking the 16×16 block as the search block;

if the EV of the 16×16 block is not smaller than the TV of 16×16 block, continuing to judge whether the EVs of all the 8×8 blocks are smaller than the TV of the 8×8 block, wherein if all the EVs of the 8×8 blocks are smaller than the TV of 8×8 block, the ED between the EVs of a plurality of 8×16 blocks and 16×8 blocks and the TV are computed and the 8×16 block or the 16×8 block having the least ED is taken as the search block;

if there are over one block of the 8×8 blocks with an EV not smaller than the TV, the EVs of the 8×8 blocks are judged one by one to decide whether the EVs are smaller than the TV of 8×8 block, wherein if there is one of the 8×8 blocks having an EV smaller than the TV, the 8×8 block is taken as the search block;

if there is no block having an EV smaller than the TV, continue to judge whether the EVs of all the 4×4 blocks are smaller than the TV of 4×4 block, wherein if the EVs of all the 4×4 blocks are smaller than the TV of 4×4 block, the 4×4 block is taken as the search block; and if there are one or more than one block of the 4×4 blocks with an EV not smaller than the TV, the ED between the EVs and the TV of the 4×8 blocks and 8×4 blocks are computed and the 4×8 block or the 8×4 block having the least ED is taken as the search block.

3. The method for motion search between video frames with multiple blocks as recited in claim 2, wherein the EV of each of the 16×16 blocks is the sum of the EVs of 16 4×4 blocks contained in the 16×16 block.

4. The method for motion search between video frames with multiple blocks as recited in claim 2, wherein the EV of each of the 8×8 blocks is the sum of the EVs of 4 4×4 blocks contained in the 8×8 block.

5. The method for motion search between video frames with multiple blocks as recited in claim 1, wherein the step for motion searches comprises:

a. using a small range pattern (SR pattern) to search a least-error block, wherein the SR pattern comprises a center point and four search points residing at the upper side, the lower side, the left side and the right side of the center point, wherein a1. if the block of the center point is the least-error block, the block of the center point is decided as a final block and the searching is ended;

a2. if the block of the center point is not the least-error block, the center point is moved to the search point with the least-error block and a large range pattern (LR pattern) is selected according to the moving direction of the center point;

b. using the SR pattern to search the least-error block, wherein the SR pattern comprises the center point and three newly-added search points surrounding the center point, wherein b1. if the block of the center point is the least-error block, the block of the center point is decided as the final block and the searching is ended;

b2. if the block of the center point is not the least-error block, the center point is moved to the search point with the least-error block;

c. using the LR pattern selected by the step a2 for searching the least-error block, wherein c1. if the LR pattern is a vertical LR pattern and the least-error block is the block of one of the upper/lower points, three search points at the upper/lower side, the left side and the right side of the center point are added;

c2. if the LR pattern is a vertical LR pattern and the least-error block is not the block of one of the upper/lower points, four search points at the upper-left/upper-right side, the lower-left/lower-right side, the upper side and the lower side of the center point are added;

c3. if the LR pattern is a horizontal LR pattern and the least-error block is the block of one of the left/right points, three search points at the left/right side, the upper side and the lower side of the center point are added;

c4. if the LR pattern is a horizontal LR pattern and the least-error block is not the block of one of the left/right points, four search points at the upper-left/upper-right side, the lower-left/lower-right side, the left side and the right side of the center point are added;

d. if the least-error block is not located at the center point, repeatedly using the LR pattern to search the least-error block; and e. if the least-error block is located at the center point, using the SR pattern to search the least-error block and judging the least-error block as the final block to end searching.

6. The method for motion search between video frames with multiple blocks as recited in claim 5, wherein the vertical LR search comprises seven search points, which comprise the center point, two search points having a distance of 2 from the center point and located at the upper side and the lower side of the center point, and four search points having a distance of $\sqrt{2}$ from the center point and located at the upper-left side, the lower-left side, the upper-right side and the lower-right side of the center point.

7. The method for motion search between video frames with multiple blocks as recited in claim 5, wherein the horizontal LR search comprises seven search points, which comprise the center point, two search points having a distance of 2 from the center point and located at the left side and the right side of the center point, and four search points having a distance of $\sqrt{2}$ from the center point and located at the upper-left side, the lower-left side, the upper-right side and the lower-right side of the center point.

8. The method for motion search between video frames with multiple blocks as recited in claim 5, wherein the newly-added three search points by the SR pattern in the step b comprise:

if the center point is the search point located at the upper side of the original center point, adding three search points located at the upper side, the left side and the right side of the center point with a distance of 1 from the center point;

if the center point is the search point located at the lower side of the original center point, adding three search points located at the upper side, the left side and the right side of the center point with a distance of 1 from the center point and;

if the center point is the search point located at the left side of the original center point, adding three search points located at the left side, the upper side and the lower side of the center point with a distance of 1 from the center point;

if the center point is the search point located at the right side of the original center point, adding three search points located at the right side, the upper side and the lower side of the center point with a distance of 1 from the center point.

9. The method for motion search between video frames with multiple blocks as recited in claim 5, wherein the vertical LR pattern in the step c1 and in the step c2 comprises:

if the center point is the search point located at the upper side of the original center point, adding three search points including a search point located at the upper side of the center point with a distance of 2 from the center point and two search points located at the upper-left side and the upper-right side of the center point with a distance of $\sqrt{2}$ from the center point;

if the center point is the search point located at the lower side of the original center point, adding three search points including a search point located at the lower side of the center point with a distance of 2 from the center point and two search points located at the lower-left side and the lower-right side of the center point with a distance of $\sqrt{2}$ from the center point;

if the center point is the search point located at the left side of the original center point, adding four search points including two search point located at the upper side and the lower side of the center point with a distance of 2 from the center point and two search points located at the upper-left side and the lower-left side of the center point with a distance of $\sqrt{2}$ from the center point; and if the center point is the search point located at the upper side of the original center point, adding four search points including a search point located at the upper side of the center point with a distance of 2 from the center point and two search points and located at the upper-left side and the upper-right side of the center point with a distance of $\sqrt{2}$ from the center point.

10. The method for motion search between video frames with multiple blocks as recited in claim 5, wherein the horizontal LR pattern in the step c3 and in the step c4 comprises:

if the center point is the search point located at the left side of the original center point, adding three search points including a search point located at the left side of the center point with a distance of 2 from the center point and two search points located at the upper-left side and the lower-left side of the center point with a distance of $\sqrt{2}$ from the center point;

if the center point is the search point located at the right side of the original center point, adding three search points including a search point located at the right side of the center point with a distance of 2 from the center point and two search points located at the upper-right side and the lower-right side of the center point with a distance of $\sqrt{2}$ from the center point;

if the center point is the search point located at the upper side of the original center point, adding four search points including two search points located at the left side and the right side of the center point with a distance of 2 from the center point and two search points located at the upper-left side and the upper-right side of the center point with a distance of $\sqrt{2}$ from the center point; and if the center point is the search point located at the lower side of the original center point, adding four search points including two search points located at the left side and the right side of the center point with a distance of 2 from the center point and two search points located at the lower-left side and the lower-right side of the center point with a distance of $\sqrt{2}$ from the center point.

11. The method for motion search between video frames with multiple blocks as recited in claim 5, wherein the newly-added three search points by the repeatedly-used vertical LR pattern in the step d comprise:

if the center point is the search point located at the upper side of the original center point, adding three search points including a search point located at the upper side of the center point with a distance of 2 from the center point and two search points located at the lower-left side and the lower-right side of the center point with a distance of $\sqrt{2}$ from the center point;

if the center point is the search point located at the lower side of the original center point, adding three search points including a search point located at the lower side of the center point with a distance of 2 from the center point and two search points located at the lower-left side and the lower-right side of the center point with a distance of $\sqrt{2}$ from the center point;

if the center point is the search point located at the upper-left side of the original center point, adding three search points including a search point located at the upper side of the center point with a distance of 2 from the center point and two search points located at the upper-left side and the lower-left side of the center point with a distance of $\sqrt{2}$ from the center point;

if the center point is the search point located at the upper-right side of the original center point, adding three search points including a search point located at the upper side of the center point with a distance of 2 from the center point and two search points located at the upper-right side and the lower-right side of the center point with a distance of $\sqrt{2}$ from the center point;

if the center point is the search point located at the lower-left side of the original center point, adding three search points including a search point located at the lower side of the center point with a distance of 2 from the center point and two search points located at the upper-left side and the lower-left side of the center point with a distance of $\sqrt{2}$ from the center point; and if the center point is the search point located at the lower-right side of the original center point, adding three search points including a search point located at the lower side of the center point with a distance of 2 from the center point and two search points located at the upper-right side and the lower-right side of the center point with a distance of $\sqrt{2}$ from the center point.

12. The method for motion search between video frames with multiple blocks as recited in claim 5, wherein the newly-added three search points by the repeatedly-used horizontal LR pattern in the step d comprise:

if the center point is the search point located at the left side of the original center point, adding three search points including a search point located at the left side of the center point with a distance of 2 from the center point and two search points located at the upper-left side and the lower-left side of the center point with a distance of $\sqrt{2}$ from the center point;

if the center point is the search point located at the right side of the original center point, adding three search points including a search point located at the right side of the center point with a distance of 2 from the center point and two search points located at the upper-right side and the lower-right side of the center point with a distance of $\sqrt{2}$ from the center point;

if the center point is the search point located at the upper-left side of the original center point, adding three search points including a search point located at the left side of the center point with a distance of 2 from the center point and two search points located at the upper-left side and the upper-right side of the center point with a distance of $\sqrt{2}$ from the center point;

if the center point is the search point located at the upper-right side of the original center point, adding three search points including a search point located at the right side of the center point with a distance of 2 from the center point and two search points located at the upper-left side and the upper-right side of the center point with a distance of $\sqrt{2}$ from the center point;

if the center point is the search point located at the lower-left side of the original center point, adding three search points including a search point located at the left side of the center point with a distance of 2 from the center point and two search points located at the lower-left side and the lower-right side of the center point with a distance of $\sqrt{2}$ from the center point; and if the center point is the search point located at the lower-right side of the original center point, adding three search points including a search point located at the right side of the center point with a distance of 2 from the center point and two search points located at the lower-left side and the lower-right side of the center point with a distance of $\sqrt{2}$ from the center point.

13. The method for motion search between video frames with multiple blocks as recited in claim 5, wherein the step for selecting the LR pattern in the step a2 comprises:

if the center point of the least-error block is the search point located at the upper side/lower side of the original center point, judging the object motion mode as an up-down motion and selecting the vertical LR pattern as the LR pattern; and if the center point of the least-error block is the search point located at the left side/right side of the original center point, judging the object motion mode as a left-right motion and selecting the horizontal LR pattern as the LR pattern.

14. The method for motion search between video frames with multiple blocks as recited in claim 5, wherein the step e comprises:

adding four search points located at the upper side, the lower side, the left side and the right side of the center point with a distance of 1 from the center point, computing the error values, taking the search block having the least error value as the final block and ending searching.

\* \* \* \* \*